(12) United States Patent
Usami et al.

(10) Patent No.: US 6,499,991 B1
(45) Date of Patent: Dec. 31, 2002

(54) LIQUID FUEL VAPORIZER HAVING SINGLE FUEL INJECTOR

(75) Inventors: Hiroyuki Usami; Hiroshi Okada, both of Kariya; Kiyoshi Kawaguchi, Toyota; Masakatsu Ueno, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/517,213

(22) Filed: Mar. 2, 2000

(30) Foreign Application Priority Data

| Mar. 3, 1999 | (JP) | ............................................. | 11-055215 |
| Jul. 23, 1999 | (JP) | ............................................. | 11-209887 |
| Dec. 10, 1999 | (JP) | ............................................. | 11-352244 |

(51) Int. Cl.$^7$ ............................................. F23D 11/44
(52) U.S. Cl. ..................... 431/238; 431/174; 431/181; 431/218; 431/11
(58) Field of Search ................................. 431/238, 239, 431/189, 186, 175, 181, 185, 174, 178, 200, 353, 115, 116, 346, 247, 207, 218, 11; 239/399, 402.5; 60/728, 742, 749; 126/44

(56) References Cited

U.S. PATENT DOCUMENTS

| 1,847,020 | A | * | 2/1932 | Parker et al. | ................ | 431/239 |
| 3,844,705 | A | * | 10/1974 | Miyahara | ..................... | 431/168 |
| 3,914,096 | A | * | 10/1975 | Schladitz | ..................... | 431/208 |
| 4,318,689 | A | * | 3/1982 | Forster et al. | ............... | 431/208 |
| 4,606,720 | A | * | 8/1986 | Harvey | ........................ | 431/115 |
| 5,224,852 | A | * | 7/1993 | Eden | ........................... | 431/116 |
| 5,813,848 | A | * | 9/1998 | Loqvist | ...................... | 431/116 |

FOREIGN PATENT DOCUMENTS

| JP | 57112602 | * | 7/1982 |
| JP | A-4-177011 | | 6/1992 |
| JP | A-6-94217 | | 4/1994 |
| JP | A-6-265111 | | 9/1994 |

* cited by examiner

Primary Examiner—Ira S. Lazarus
Assistant Examiner—Josiah C. Cocks
(74) Attorney, Agent, or Firm—Harness, Dickey & Pierce, PLC (57) ABSTRACT

A liquid fuel vaporizer includes a combustion chamber in which heat is generated by burning fuel therein, an vaporization chamber in which liquid fuel is vaporized by the heat transferred from the combustion chamber to the vaporization chamber. Both chambers are integrally built in a housing, and liquid fuel is supplied from a single injector to both chambers. Liquid fuel consisting of small particles is supplied to the combustion chamber to improve combustion efficiency. Vaporized fuel in the vaporization chamber is prevented from being ignited and burnt therein by various manners, such as intercepting combustion flame, controlling an air/fuel ratio in a range out of a combustible range, or keeping vaporized fuel temperature at a level lower than its self-igniting temperature.

10 Claims, 11 Drawing Sheets

LIQUID FUEL VAPORIZER HAVING SINGLE FUEL INJECTOR

CROSS-REFERENCE TO RELATED APPLICATIONS

This application is based upon and claims benefit of priority of Japanese Patent Applications No. Hei-11-55215 filed on Mar. 3, 1999, No. Hei-11-209887 filed on Jul. 23, 1999 and No. Hei-11-352244 filed on Dec. 10, 1999, the contents of which are incorporated herein by reference.

BACKGROUND OF THE INVENTION

1. Field of the Invention

The present invention relates to a device for vaporizing liquid fuel. The vaporized fuel is supplied to various kinds of burners, internal combustion engines or any other like apparatus.

2. Description of Related Art

Liquid fuel vaporizers for supplying vaporized fuel to burners or the like are known and disclosed, for example, in JP-A-6-265111 and JP-A-4-177011. The vaporizer disclosed in those publications includes a combustion chamber in which liquid fuel is burnt, a vaporization chamber in which liquid fuel is heated and vaporized by the heat generated in the combustion chamber. Both chambers are formed separately, and the vaporization chamber is disposed downstream of the combustion chamber. The liquid fuel is supplied to both combustion and vaporization chambers from respective fuel injectors. Because both chambers are made separately and two fuel injectors are necessary in this structure, the device becomes bulky and costly, and is not easy to mount on a device to which the vaporized fuel is supplied.

SUMMARY OF THE INVENTION

The present invention has been made in view of the above-mentioned problems, and an object of the present invention is to provide an improved liquid fuel vaporizer in which both combustion and vaporization chambers are housed in a housing and a single fuel injector is used for supplying fuel to both chambers.

A liquid fuel vaporizer according to the present invention is composed of a housing, a combustion chamber, a vaporization chamber and a fuel injector. Both the combustion and vaporization chambers are housed in a housing, and liquid fuel such as gasoline is supplied from a common fuel injector to both chambers. Liquid fuel supplied to the combustion chamber is burnt to generate heat. Liquid fuel supplied to the vaporization chamber is heated and vaporized by the heat generated in the combustion chamber. The vaporized fuel is fed to an outside device such as a burner connected to the liquid fuel vaporizer.

Preferably, both the combustion and vaporization chambers are cylinder-shaped, the combustion chamber being coaxially disposed inside the vaporization chamber, and both chambers are connected to each other by a burnt gas passage. The burnt gas in the combustion chamber is led to the vaporization chamber through the burnt gas passage and heats up the liquid fuel in the vaporization chamber to vaporize the liquid fuel therein. The burnt gas passage serves to introduce the burnt gas into the vaporization chamber and to prevent combustion flame from entering into the vaporization chamber. An injector plate having a set of small holes and another set of large holes is attached to the fuel injector. Fuel injected through the small injection holes is cracked into smaller particles and then supplied to the combustion chamber, thereby improving ignitability of the fuel in the combustion chamber. Fuel injected through the large injection holes is directly supplied to the vaporization chamber.

The liquid fuel may be injected through only one set of injection holes and supplied to both chambers. In this case, a fuel collision block is disposed around the injector, so that part of liquid fuel collides with the block, being cracked into small particles, and then the small particles of fuel are supplied to the combustion chamber to improve ignitability. On the other hand, the liquid fuel is directly supplied to the vaporization chamber without colliding with the block. A fuel absorber may be disposed on the fuel collision block so that liquid fuel adhering to the block upon its collision with the block is temporarily absorbed and vaporized by the heat from the combustion chamber. A series of depressions and projections may be formed in place of the fuel absorber for the same purpose.

An air/fuel ratio in the combustion chamber is controlled within a combustible range, while the air/fuel ratio in the vaporization chamber is controlled in a range that falls out of the combustible range to ensure that no combustion occurs in the vaporization chamber. Alternatively, the burnt gas supplied from the combustion chamber to the vaporization chamber may be cooled down by cooling air to a temperature lower than a level at which fuel in the vaporization chamber is ignited. A mixture of combustible liquid fuel and incombustible fluid may be supplied to both the combustion and vaporization chambers in place of the liquid fuel to prevent combustion of vaporized fuel in the vaporization chamber.

According to the present invention, the whole structure of the liquid fuel vaporizer is simplified because both the combustion and evaporation chambers are integrally housed in a housing and a single injector supplies fuel to both chambers. Moreover, combustion of the vaporized fuel in the vaporization chamber is prevented without fail.

Other objects and features of the present invention will become more readily apparent from a better understanding of the preferred embodiments described below with reference to the following drawings.

DETAILED DESCRIPTION OF THE PREFERRED EMBODIMENTS

Figure 1:
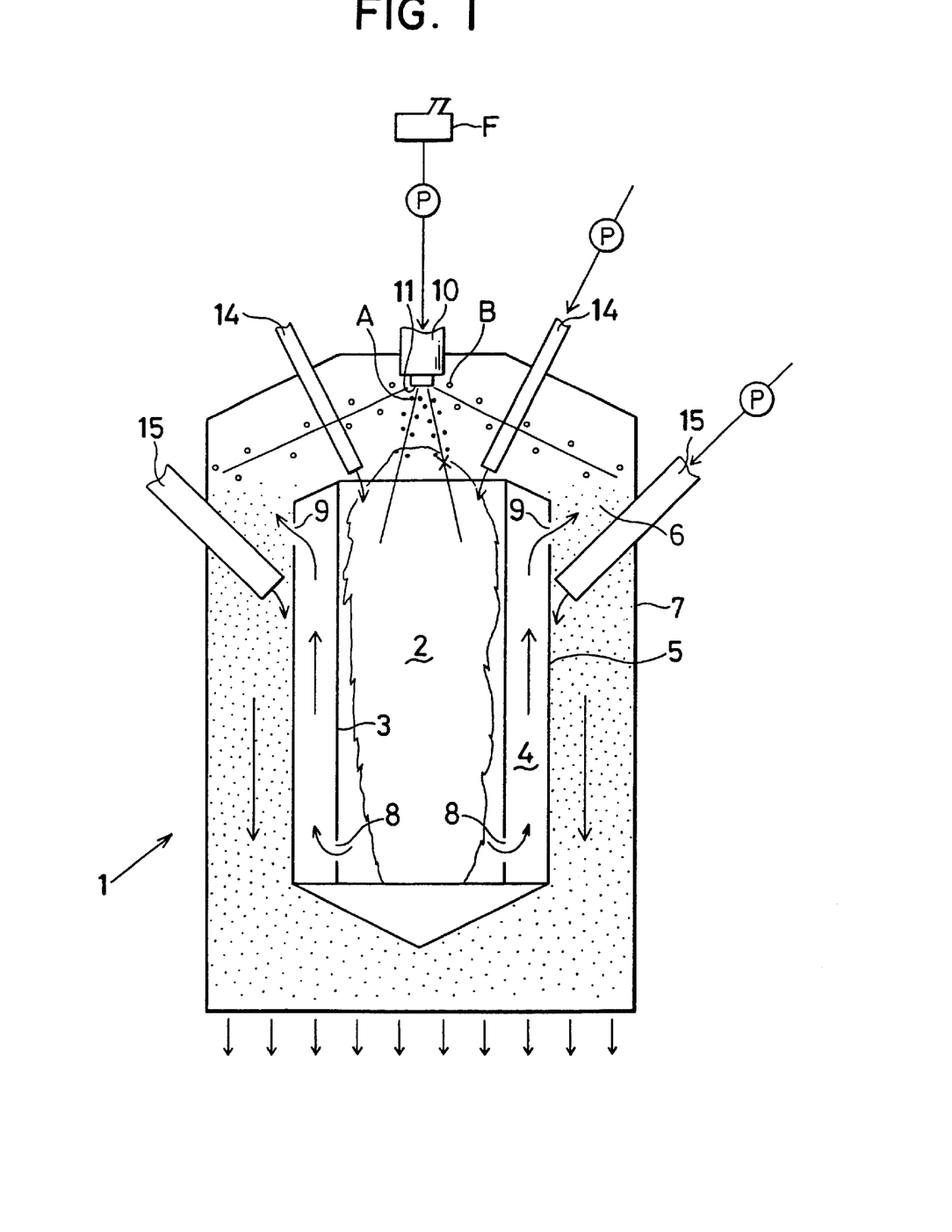
FIG. 1 is a cross-sectional elevation view showing a whole structure of a liquid fuel vaporizer as a first embodiment of the present invention.
Figure 2A:
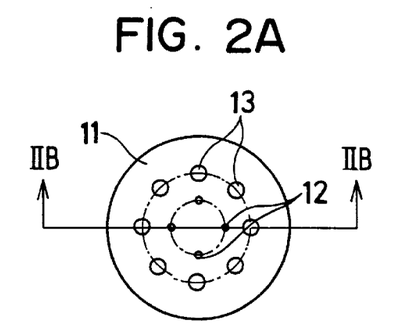
FIG. 2A is a plan view showing a fuel injection plate used in the first embodiment.
Figure 2B:
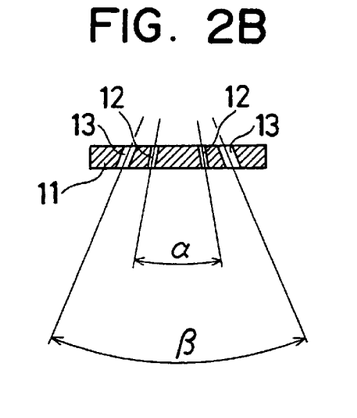
FIG. 2B is a cross-sectional view showing the fuel injection plate, taken along line IIB—IIB in FIG. 2A.
Figure 3:
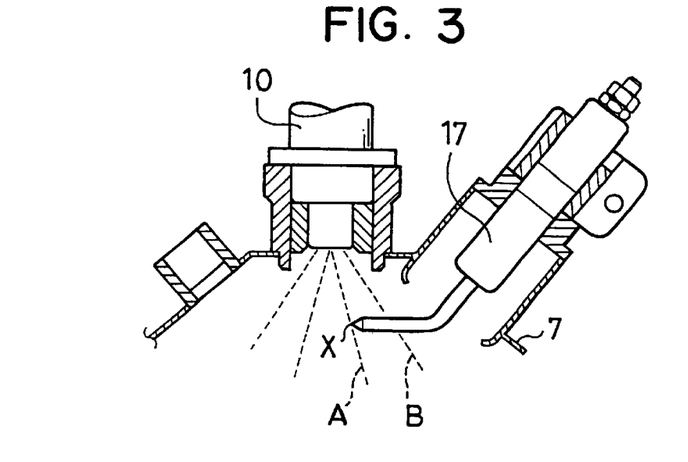
FIG. 3 is a partial cross-sectional view showing an upper portion of the vaporizer in which a fuel injector and a spark plug are installed.

A first embodiment of the present invention will be described in reference to FIGS. 1 to 3. The liquid fuel vaporizer 1 shown in FIG. 1 is used for supplying vaporized fuel to an internal combustion engine, but it may be used for other purposes such as for supplying vaporized fuel to a burner device. The liquid fuel vaporizer 1 is composed of: a cylindrical housing 7 in which all components are housed; an inner cylinder 3 for forming a combustion chamber 2 therein; an outer cylinder 5 disposed outside of the inner cylinder 3 with a space therebetween; a burnt gas passage 4 formed between the inner and outer cylinders 3 and 5; a vaporization chamber 6 formed between the outer cylinder 5 and the housing 7; an electromagnetic fuel injector 10 mounted on the top of the vaporizer; first air injection ports 14 for supplying air into the combustion chamber 2; and second air injection ports 15 for supplying air into the vaporization chamber 6.

The inner cylinder 3 is open at its top end and has lower openings 8 at its cylindrical wall close to the bottom end. Gas burnt in the combustion chamber 2 is introduced into the burnt gas passage 4 through the lower openings 8. The outer cylinder 5 is disposed coaxially with the inner cylinder 3, forming the burnt gas passage 4 therebetween, and has upper openings 9 at a position close to the top end. The burnt gas is introduced into the vaporization chamber 6 through the upper openings 9. The burnt gas in the combustion chamber 2 flows out through the lower openings 8 into the burnt gas passage 4 and flows out from the burnt gas passage 4 into the vaporization chamber 6 through the upper openings 9. The burnt gas passage 4 servers as a passage to lead the burnt gas into the vaporization chamber 6 and as a flame interceptor for preventing flame in the combustion chamber 2 from entering into the vaporization chamber 6.

The housing 7 is cylinder-shaped with the top end closed and the bottom end open. The electromagnetic fuel injector 10 is mounted on the closed top end of the housing 7. Liquid fuel such as gasoline, light oil, kerosene or methanol is supplied to both the combustion chamber 2 and the vaporization chamber 6. Vaporized fuel flows out from the housing 7 through its open bottom end. A fuel pump "P" is connected to the fuel injector 10 for supplying pressurized fuel to the fuel injector 10. The liquid fuel is supplied to the fuel pump from a fuel tank "F". The fuel injector 10 injects fuel according to electric signals fed thereto.

The fuel injector 10 includes an injection plate 11 disposed at its bottom end. Details of the injection plate 11 are shown in FIGS. 2A and 2B: FIG. 2A showing its plan view and FIG. 2B showing its cross-sectional view taken along line IIB—IIB in FIG. 2A. First injection holes 12 for injecting fuel into the combustion chamber 2 and second injection holes 13 for injecting fuel into the vaporization chamber 6 are formed in the injection plate 11. The first injection holes 12 are formed along a small inner circle, while the second injection holes 13 are formed along a large outer circle. As shown in FIG. 2B, the first injection holes 12 form a smaller injection angle α for injecting fuel toward the combustion chamber 2 disposed inside of the vaporization chamber 6, while the second injection holes form a larger injection angle β for injecting fuel toward the vaporization chamber 6.

The hole size of the first injection holes 12 is smaller than that of the second injection holes 13. Accordingly, liquid fuel "A" of small particles is supplied to the combustion chamber 2 and liquid fuel "B" of large particles is supplied to the vaporization chamber 6, as shown in FIG. 1. As shown in FIG. 3, a spark plug 17 is installed on the top portion of the housing 7 next to the fuel injector 10, and its igniting point "X", at which the small particle fuel "A" injected from the first injection holes 12 is ignited, is disposed within the injection angle α. Therefore, the fuel is effectively ignited at the igniting point "X".

The first air injection ports 14 are installed on the upper portion of the housing 7, so that air sent from an air pump "P" is blown into the combustion chamber 2 through the first air injection ports 14. The second air injection ports 15 are installed on the housing 7, so that air is blown into the vaporization chamber 6 toward its open bottom end thereby to push out the vaporized fuel in the vaporization chamber 6.

The operation of the liquid fuel vaporizer 1 described above will be described below. Small particle liquid fuel "A" is injected toward the combustion chamber 2. The fuel is ignited at the igniting point "X" and blown into the combustion chamber 2 where the fuel is burnt. High temperature burnt gas in the combustion chamber 2 flows out therefrom and is supplied to the vaporization chamber 6 through the lower openings 8, the burnt gas passage 4 and the upper openings 9. On the other hand, large particle liquid fuel "B" is supplied to the vaporization chamber 6 from its upper portion. The liquid fuel is exposed to the hot burnt gas in the vaporization chamber 6, and thereby the liquid fuel is heated and vaporized. The vaporized fuel is not ignited because the igniting point "X" is located apart from the vaporized fuel. The vaporized fuel is pushed out through the open bottom end of the housing 7 along the air flow supplied from the second air injection ports 15, and is supplied to a device such as a burner connected to the vaporizer 1.

Since the vaporized fuel is supplied to the device connected to the vaporizer 1, the fuel is completely burnt in the device, thereby harmful emission from the device being prevented. Since the combustion chamber 2 and the vaporization chamber 6 are integrally formed in the housing 7, the structure of the vaporizer 1 is simplified, and the fuel is uniformly heated in the vaporization chamber 6. Since the liquid fuel is supplied to both the combustion and vaporization chambers from one fuel injector 10, the vaporizer 1 can be manufactured at a lower cost. Since smaller particles of fuel are supplied to the combustion chamber 2, the fuel is easily ignited at the igniting point. Since larger particles of fuel are supplied to the vaporization chamber 6, combustion in the vaporization chamber is prevented.

Figure 4A:
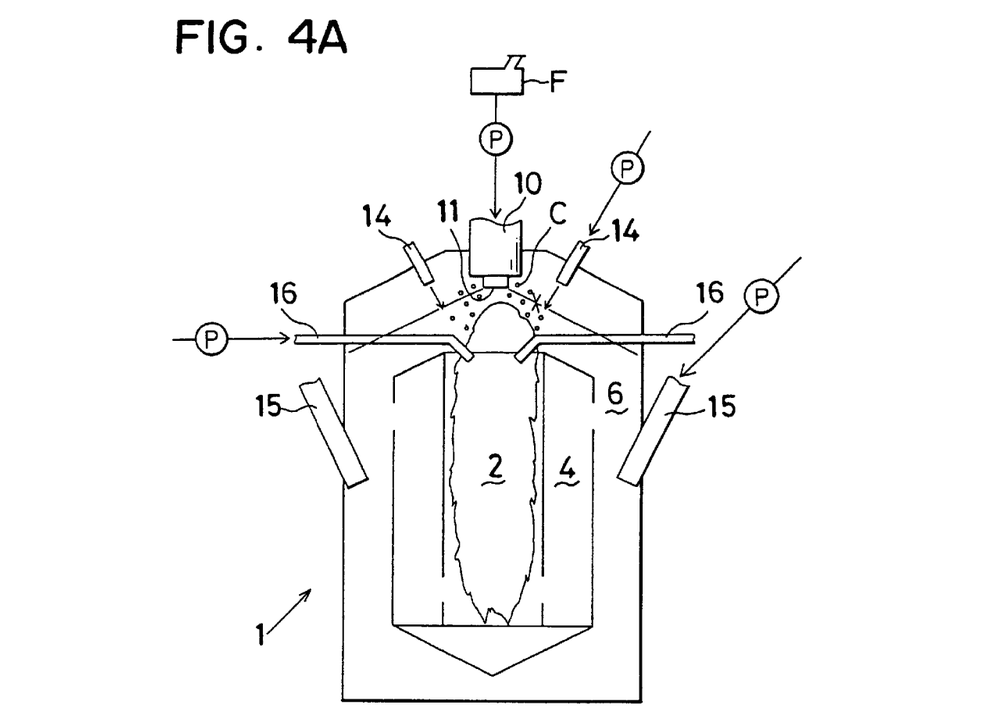
FIGS. 4A and 4B are cross-sectional views showing a liquid fuel vaporizer as a second embodiment of the present invention.
Figure 4B:
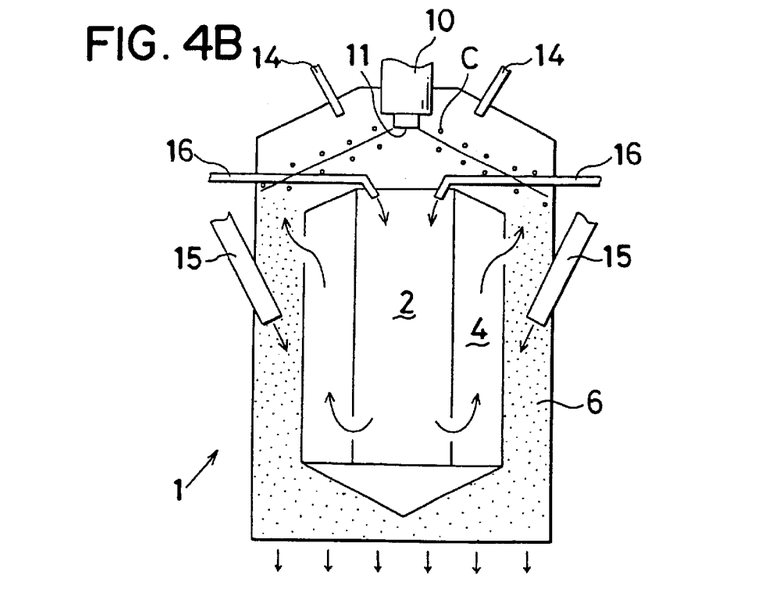

Referring to FIGS. 4A and 4B, a second embodiment of the present invention will be described. In this embodiment, the fuel injection plate 11 has only one kind of the fuel injection ports that cover a large injection angle β, and the fuel injection ports covering a small injection angle α are removed. Outside air is supplied alternately from the first air injection ports 14 and from the second air injection ports 15. FIG. 4A shows a first state where the air is supplied from the first air injection ports 14 toward the combustion chamber 2, while FIG. 4B shows a second state where the air is supplied from the second air injection ports 15 into the vaporization chamber 6.

In the first state shown in FIG. 4A, liquid fuel "C" injected from the fuel injector 10 is blown by the air supplied from the first air injection ports 14 into the combustion chamber 2. No air is supplied from the second air injection ports 15 in this state. The fuel is ignited at the igniting point "X" which is located within the injection angle β. The air/fuel mixture supplied into the combustion chamber 2 is burnt therein.

In the second state shown in FIG. 4B, outside air is supplied into the vaporization chamber 6 from the second air injection ports 15, while the air supply from the first air injection ports 14 is stopped. In this state, additional air is supplied from auxiliary air injection ports 16 into the combustion chamber 2 to push out the burnt gas in the combustion chamber 2 toward the vaporization chamber 6. When the air supply from the first air injection ports 14 is stopped, the liquid fuel is injected into the vaporization chamber 6. At the same time, the hot burnt gas in the combustion chamber 2 is pushed out into the vaporization chamber 6 by the air supplied from the auxiliary air injection ports 16. The liquid fuel supplied to the vaporization chamber 6 is exposed to the burnt gas, and thereby heated and vaporized. The vaporized fuel is blown out of the evaporator 1 by the air supplied from the second air injection ports 15. The vaporized fuel in the vaporization chamber 6 is not ignited because the igniting point "X", is positioned far apart from the vaporized fuel.

A third embodiment of the present invention will be described in reference to FIGS. 5, 6A, 6B and 6C. In this embodiment, the fuel injection plate 11 has fuel injection holes 13a that form the large injection angle β covering both of the combustion chamber 2 and vaporization chamber 6, and no injection holes forming the small injection angle α are provided. A fuel collision block 20 is additionally disposed around the fuel injection plate 11. Part of the liquid fuel supplied from the fuel injector 10 collides with the collision block 20. Thereby, the liquid fuel is cracked into small particles and its injection direction is changed to a direction toward the combustion chamber 2. Other part of the liquid fuel injected from the injector 10 is directly supplied to the vaporization chamber 6.

Figure 5:
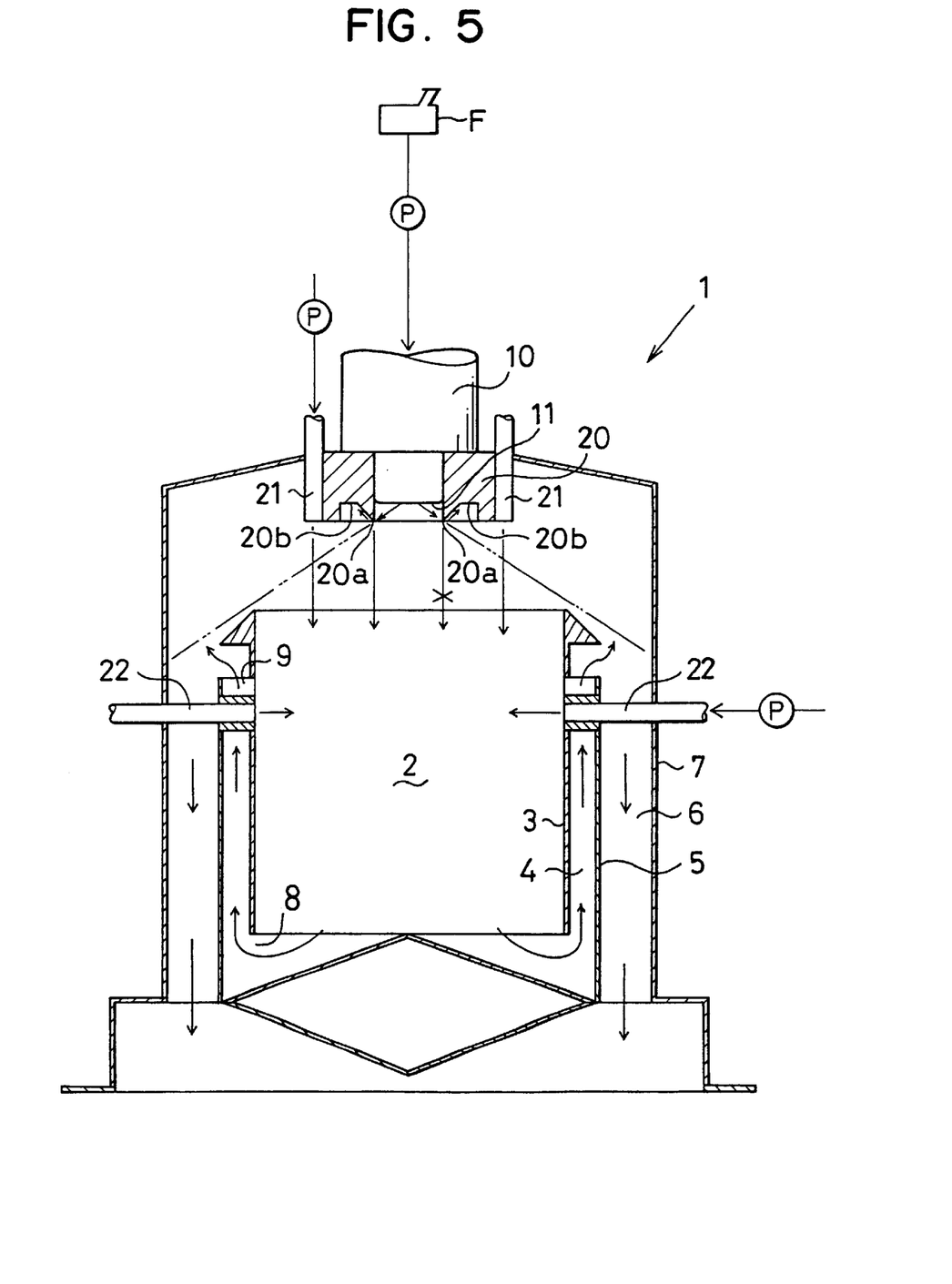
FIG. 5 is a cross-sectional view showing a liquid fuel vaporizer as a third embodiment of the present invention.
Figure 6A:
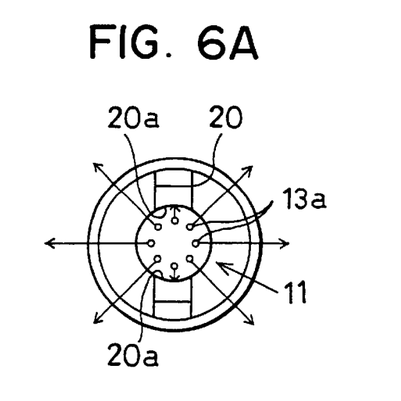
FIGS. 6A, 6B and 6C are drawings showing a fuel collision block used in the third embodiment.
Figure 6B:
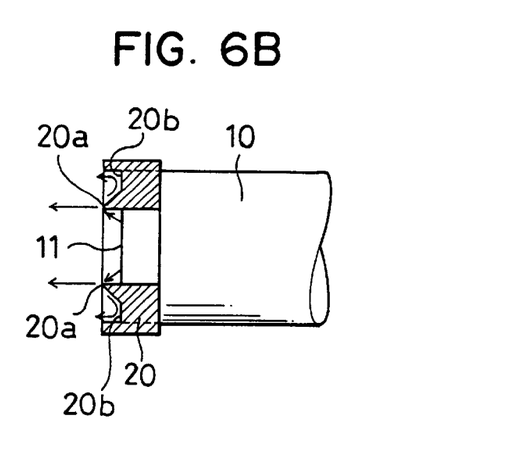
Figures 6C, 7:
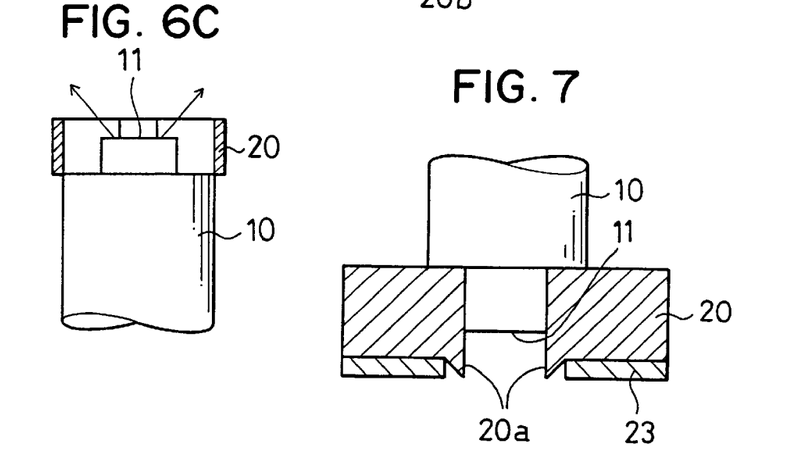
FIG. 7 is a cross-sectional view showing a modified form of the fuel collision block.

Details of the collision block 20 are shown in FIGS. 6A, 6B and 6C. As shown in FIG. 6A, eight injection holes 13a are formed on the injection plate 11. The liquid fuel injected from two holes (a top hole and a bottom hole in FIG. 6A) collides with two sharp edges 20a formed on the collision block 20, thereby its direction being changed to an axial direction of the injector 10, as shown in FIG. 6B. The liquid fuel injected from other six injection holes 13a is directly supplied to the vaporization chamber 6 without colliding with the sharp edges 20a, as shown in FIG. 6C. The igniting point "X" formed by the spark plug 17 is disposed downstream of the sharp edge 20a, as shown in FIG. 5.

As shown in FIG. 6B, the sharp edges 20a are formed on two portions along the periphery of the center hole of the collision block 20, and a depression 20b is formed behind each sharp edge 20a. Some of the liquid fuel colliding with the sharp edges 20a adheres to the sharp edges, spreading on outer and inner surfaces of the sharp edges 20a and the surface of the depressions 20b. In other words, the liquid fuel spreads on a relatively wide surface area, and therefore the liquid fuel is easily vaporized by the heat from the combustion chamber 2 without growing to a droplet. Amount of fuel adhering to the sharp edges 20a is reduced by the depressions 20b formed behind the sharp edges 20a.

As shown in FIG. 5, outside air is supplied only to the combustion chamber 2, not to the vaporization chamber 6. Vertical air injection ports 21 are disposed outside the collision block 20 to vertically inject air into the combustion chamber 2, and horizontal air injection ports 22 are installed on the inner cylinder 3 to horizontally inject air into the combustion chamber 2. Outside air is pressurized by respective air pumps connected to air injection holes. The horizontal air injection ports 22 are designed to generate a circular air stream in the combustion chamber 2 to enhance combustion efficiency.

Since the liquid fuel is supplied to the combustion chamber 2 after the liquid fuel is cracked into smaller particles by collision with the fuel collision block 20, combustion efficiency is enhanced and harmful exhaust emission is reduced. Ignitability is improved by making liquid fuel into small particles. Since liquid fuel adherence to the collision block 20 is suppressed by forming depressions 20b behind the sharp edges 20a, no fuel droplets grow on the collision block 20. Accordingly, no such droplets are supplied to the combustion chamber 2, and thereby combustion efficiency is improved.

The fuel collision block 20 described above may be modified to various forms. Some examples of the modified collision block will be described in reference to FIGS. 7, 8 and 9. In the collision block 20 shown in FIG. 7, the depressions 20b formed behind the sharp edges 20a are replaced with a fuel absorber 23 disposed outside of the sharp edges 20a. The fuel absorber 23 is made of a heat resistive material that absorbs liquid fuel therein, such as porous ceramics, a porous metallic material or metallic meshes. The liquid fuel adhering to the collision block 20 is absorbed by the fuel absorber 23 and vaporized by the heat generated in the combustion chamber 2, thereby preventing the liquid fuel from growing to droplets.

Figure 8:
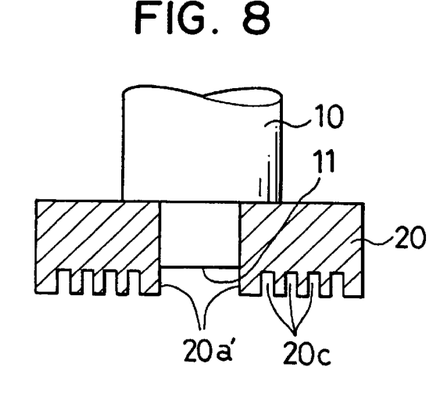
FIG. 8 is a cross-sectional view showing another modified form of the fuel collision block.

In the collision block 20 shown in FIG. 8, the sharp edges 20a are modified to rectangular projections 20a', and the depressions 20b are replaced with plural ditches 20c formed behind the projections 20a'. The liquid fuel colliding with the collision block 20 spreads over the plural ditches 20c and is easily vaporized by the heat from the combustion chamber 2. The amount of fuel itself adhering to the block 20 is reduced by the plural ditches 20c.

Figure 9:
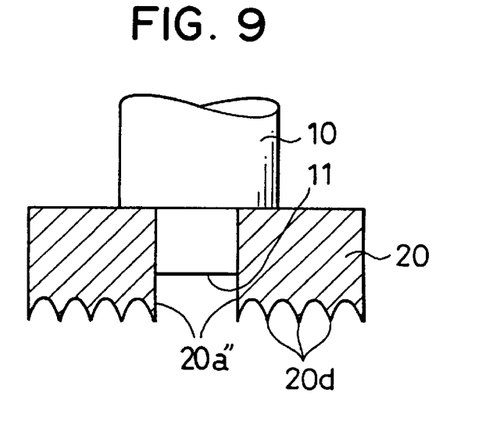
FIG. 9 is a cross-sectional view showing yet another modified form of the fuel collision block.

Another form of the collision block 20 is shown in FIG. 9, in which the sharp edges 20a are slightly modified to a sharper edges 20a", and the depressions 20b are replaced with plural sharp projections 20d. The fuel adhering to the block 20 spreads over the plural sharp projections 20d and is easily vaporized, and thereby formation of the fuel droplets on the block is prevented. Even if a droplet is formed on the tip of the sharp projections 20d, it drops off from the tip before it grows to a large droplet. Small droplets are easily burnt in the combustion chamber 2 without increasing harmful exhaust emission.

A fourth embodiment of the present invention will be described in reference to FIG. 10. In this embodiment, an air/fuel ratio in the combustion chamber 2 is controlled to a fuel-lean side within a combustible range, while an air/fuel ratio in the vaporization chamber 6 is controlled to a far fuel-lean side that lies outside the combustible range. Outside air is supplied to the combustion chamber 2 from the vertical air injection ports 21 and the horizontal air injection ports 22, in the same manner as in the third embodiment. The amount of air supplied from the horizontal air injection ports 22 is controlled, so that the air/fuel ratio in the combustion chamber 2 becomes fuel-lean within the combustible range.

To make the air/fuel ratio in the vaporization chamber 6 fuel-lean in a range outside the combustible range, outside air is directly supplied to the vaporization chamber 6 from additional air injection ports 27 disposed on the top end of the housing 7. The air supplied from the ports 27 is mixed with fuel injected from the fuel injector 10 and burnt gas sent from the combustion chamber 2, thereby making the air/fuel ratio far fuel-lean. The fuel injection plate 11 used in this embodiment is the same as that of the first embodiment, i.e., the injection plate having a large injection angle and a small injection angle. However, the injection plate 11 may be replaced with the same injection plate 11 used in the third embodiment, i.e., the injection plate having only a large injection angle, and part of liquid fuel may be supplied to the combustion chamber 2 in the same manner as in the third embodiment.

Since the air/fuel ratio in the vaporization chamber 6 is controlled to the far fuel-lean side that lies out of the combustible range, fuel vaporized in the vaporization chamber 6 never be ignited even if hot burnt gas having a temperature higher than an ignition temperature is supplied from the combustion chamber 2 to the vaporization chamber 6.

Figure 10:
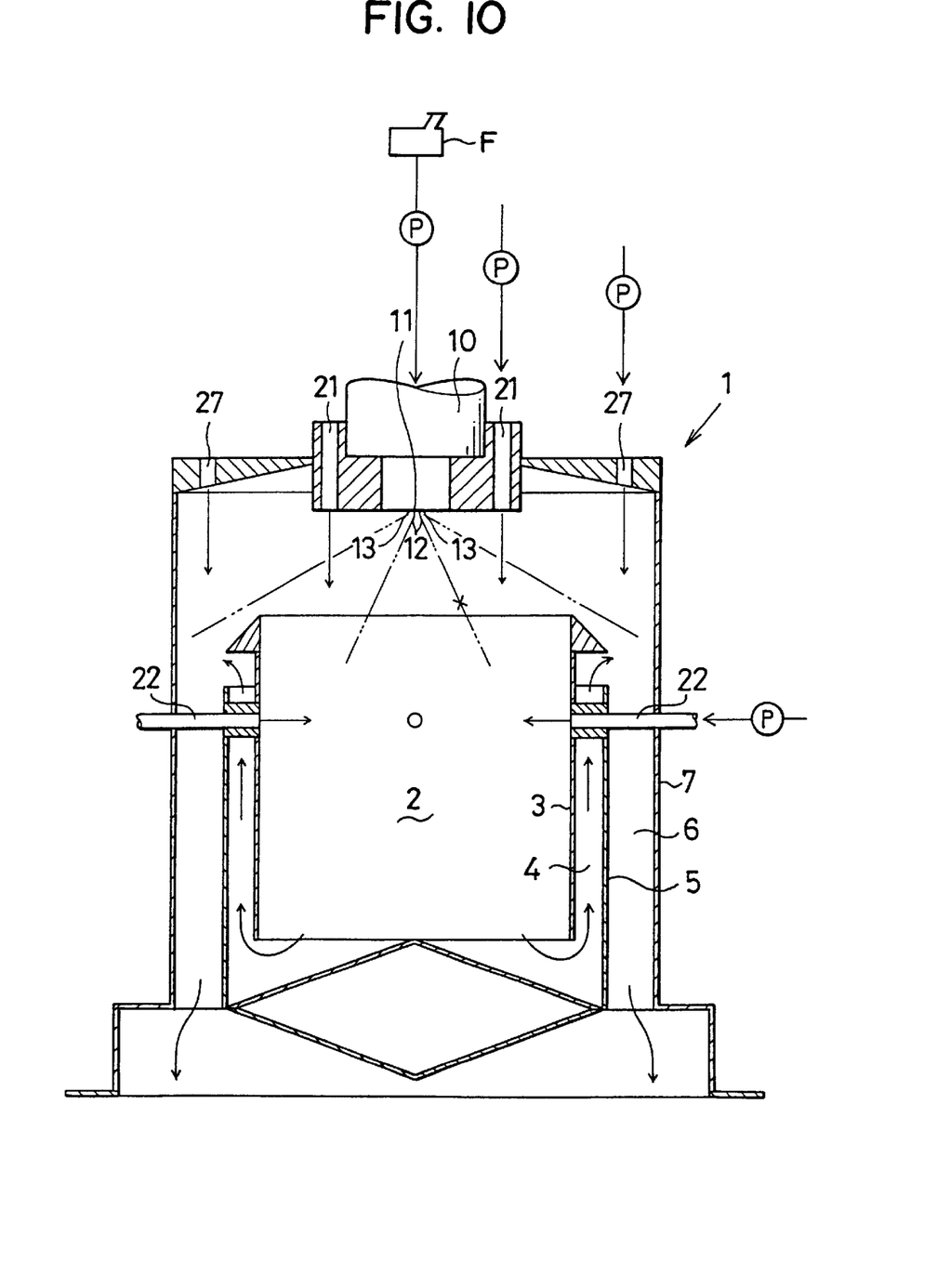
FIG. 10 is a cross-sectional view showing a liquid fuel vaporizer as a fourth embodiment of the present invention.
Figure 11:
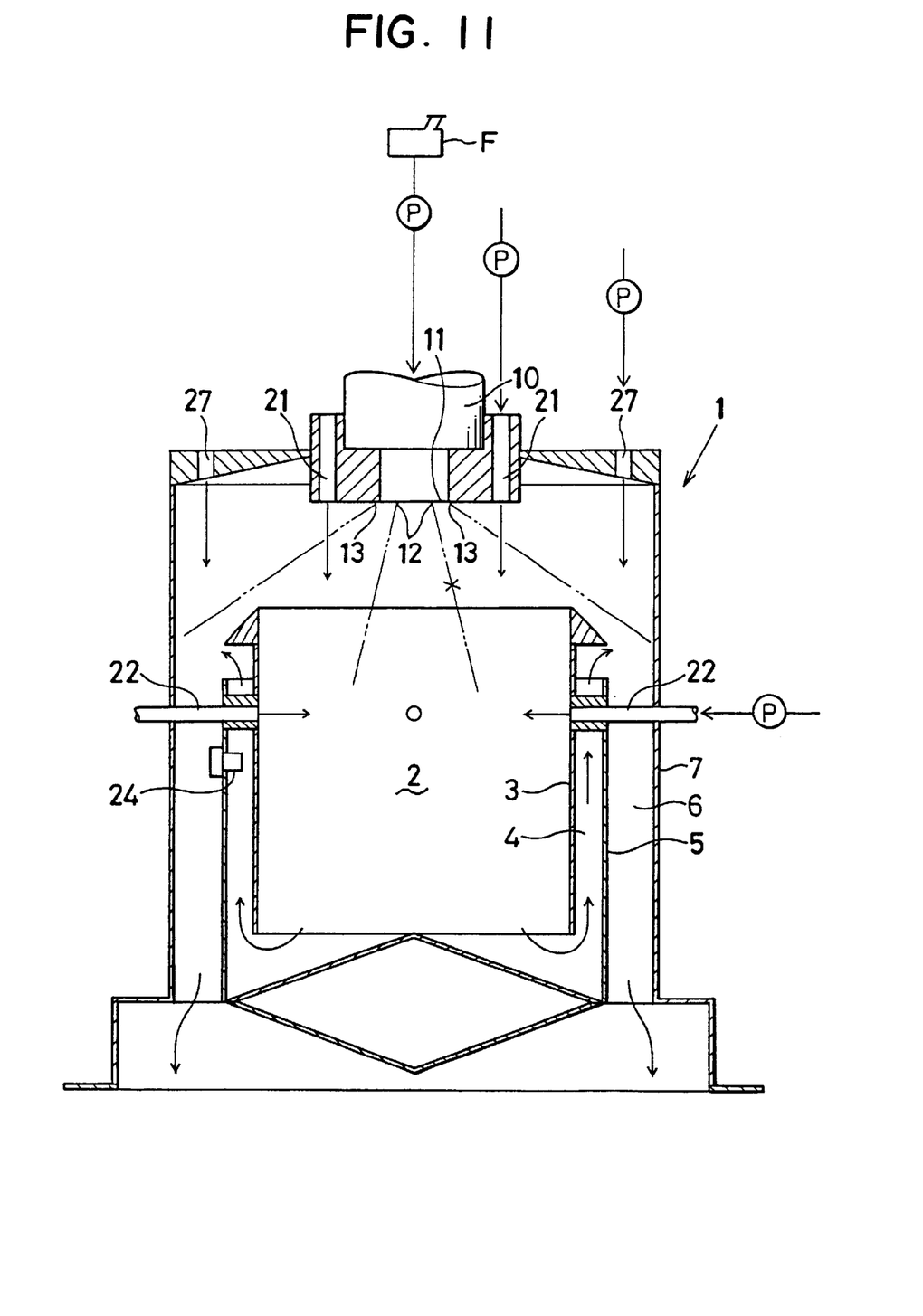
FIG. 11 is a cross-sectional view showing a modified form of the fourth embodiment.

The fourth embodiment shown in FIG. 10 may be modified to a form shown in FIG. 11. In this modification, a temperature sensor 24 is disposed in the burnt gas passage 4 to measure temperature of the burnt gas to be supplied to the vaporization chamber 6. The amount of air supplied from the air injection ports 27 to the vaporization chamber 6 is controlled according to the burnt gas temperature measured by the temperature sensor 24. That is, the amount of air is increased to make the air/fuel ratio in the vaporization chamber 6 far fuel-lean, when the burnt gas temperature is higher than a predetermined level, i.e., a preset level lower than a self-igniting temperature. In this manner, unnecessary air supply is cut out and thereby power for driving the air pump is saved. The amount of air can be varied, for example, by using an air pump having variable capacities or installing a control valve in a passage connecting the air pump and the air injection port 27.

Figure 12:
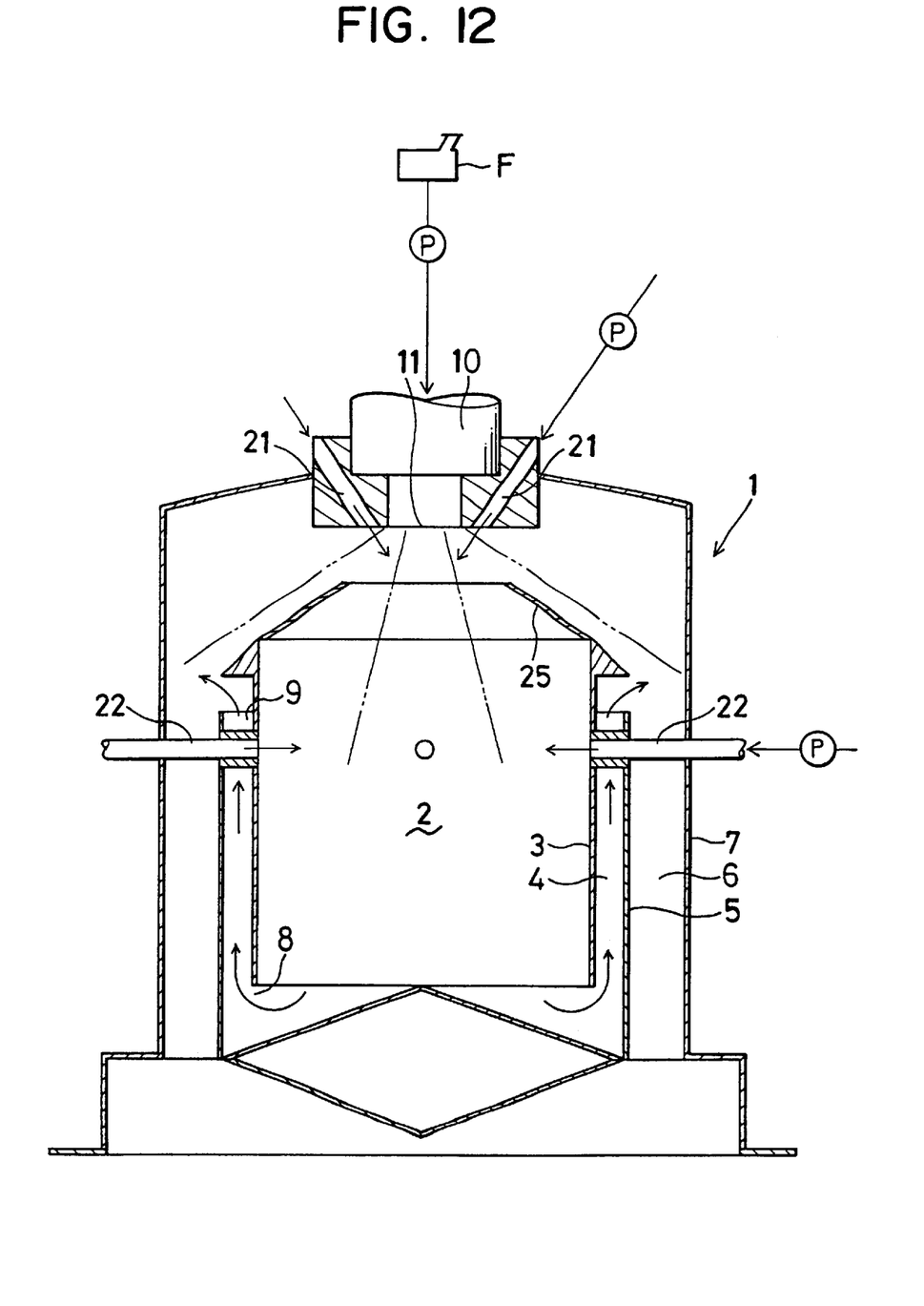
FIG. 12 is a cross-sectional view showing a liquid fuel vaporizer as a fifth embodiment of the present invention.

A fifth embodiment of the present invention will be described in reference to FIG. 12. In this embodiment, an air/fuel ratio in the combustion chamber 2 is controlled to a fuel-rich side within a combustible range, while an air/fuel ratio in the vaporization chamber 6 is controlled to a far fuel-rich side that lies out of the combustible range. Outside air is supplied only to the combustion chamber 2 from both air injection ports 21 and 22. The amount of air is controlled so that the air/fuel ratio in the combustion chamber 2 becomes fuel-rich within the combustible range.

It is necessary in this embodiment to surely supply air into the combustion chamber 2 from the air injection ports 21 and not to supply air into the vaporization chamber 6. For this purpose, the air injection ports 21 are disposed with a slanted angle directed to the combustion chamber 2, and a separating plate 25 is disposed on the top end of the inner cylinder 3. The separating plate 25 also serves to prevent combustion flame in the combustion chamber 2 from entering into the vaporization chamber 6.

Since, in this embodiment, the air/fuel ratio in the combustion chamber 2 is controlled to the fuel-rich side within the combustible range and the air/fuel ratio in the vaporization chamber 6 is kept in the far fuel-rich side out of the combustible range by not supplying air thereinto, the vaporized fuel in the vaporization chamber 6 never be ignited even if hot burnt gas having a temperature higher than a self-igniting level is supplied to the vaporization chamber 6.

Figure 13:
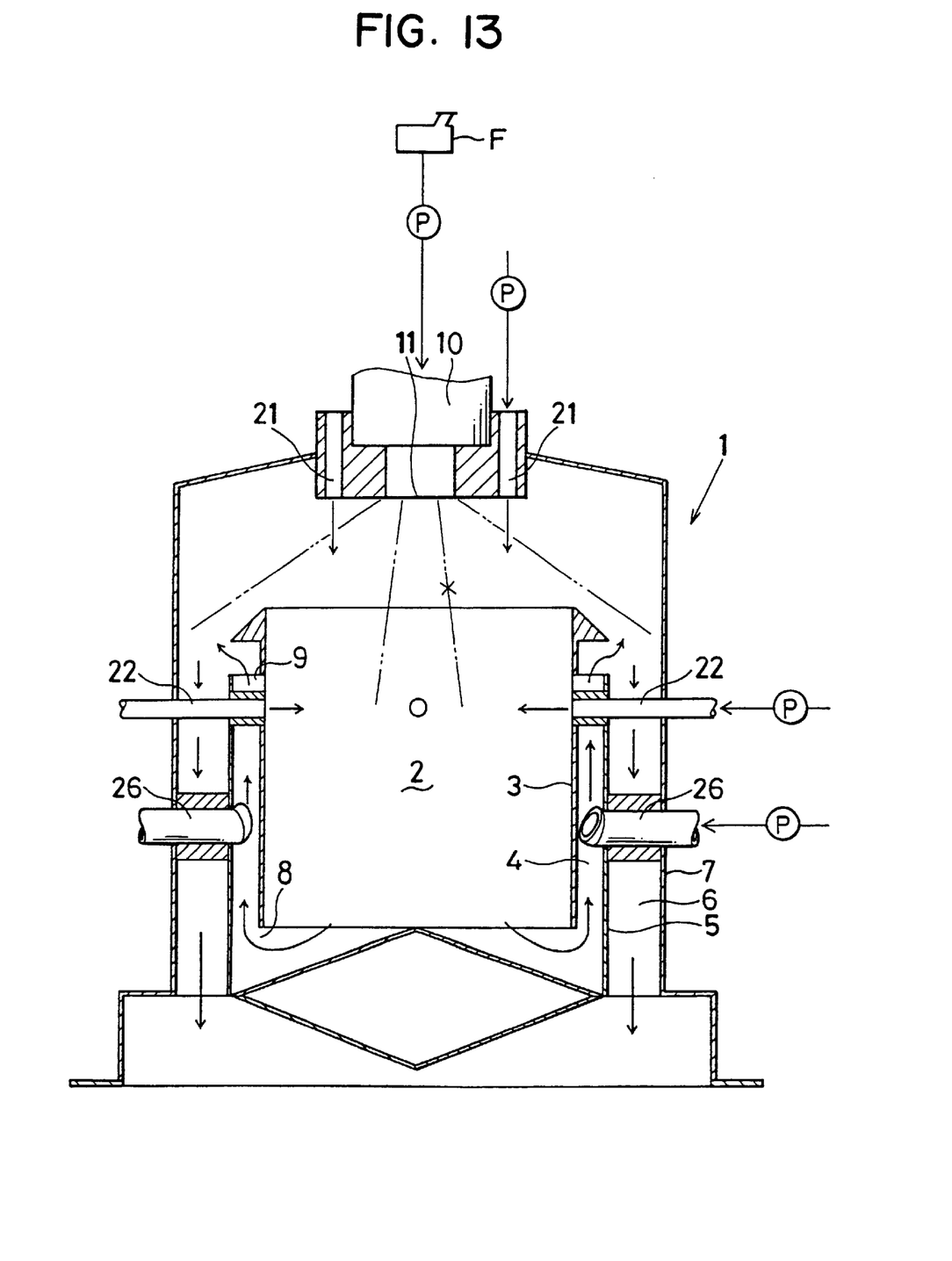
FIG. 13 is a cross-sectional view showing a liquid fuel vaporizer as a sixth embodiment of the present invention.

A sixth embodiment of the present invention will be described in reference to FIG. 13. In this embodiment, outside air for cooling the burnt gas is introduced into the burnt gas passage 4 from additional air injection ports 26. The air supplied from the air injection ports 26 is pressurized by an air pump. The temperature of the burnt gas to be introduced into the vaporization chamber 6 is lowered, by mixing the cooling air with the burnt gas, to a level that is lower than the fuel-self-igniting temperature. Therefore, the vaporized fuel in the vaporization chamber 6 never be burnt even if the air/fuel ratio in the vaporization chamber 6 is within the combustible range.

The sixth embodiment described above may be modified to a form shown in FIG. 14. In this modification, a temperature sensor 24 for measuring the burnt gas temperature is installed in the burnt gas passage 4. The amount of cooling air supplied from the air injection ports 26 is controlled according to the burnt gas temperature. That is, when the burnt gas temperature is higher than a predetermined level, the amount of cooling air is increased, and when the burnt gas temperature is low, the amount of cooling air is decreased. The amount of cooling air may be controlled in various ways, e.g., by an air pump having variable capacities or an airflow control valve.

Figure 14:
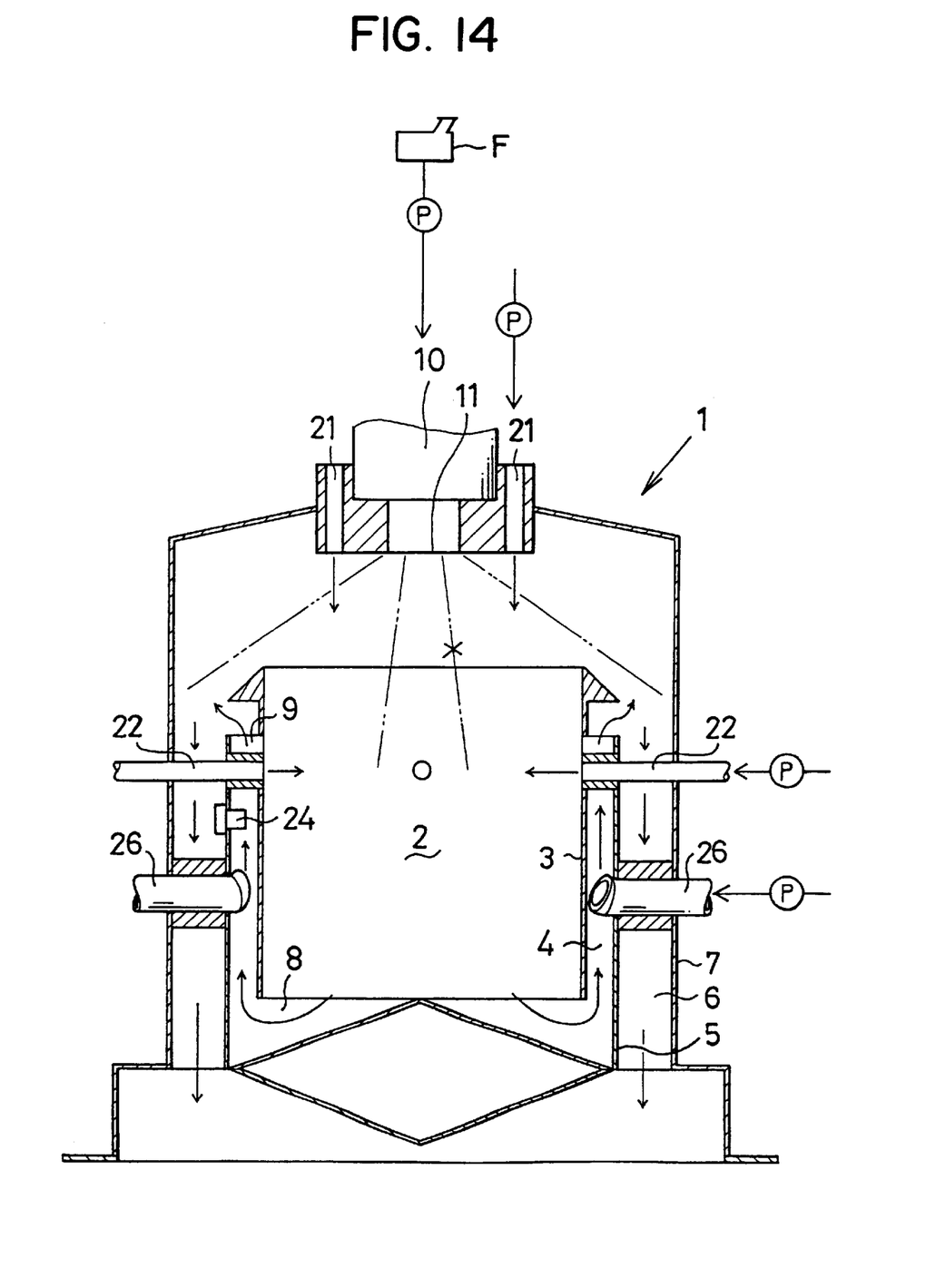
FIG. 14 is a cross-sectional view showing a modified form of the sixth embodiment.

Since the amount of cooling air is controlled according to the burnt gas temperature in this embodiment, an excessive and unnecessary air supply is avoided, and thereby power for driving the air pump is saved.

Figure 15:
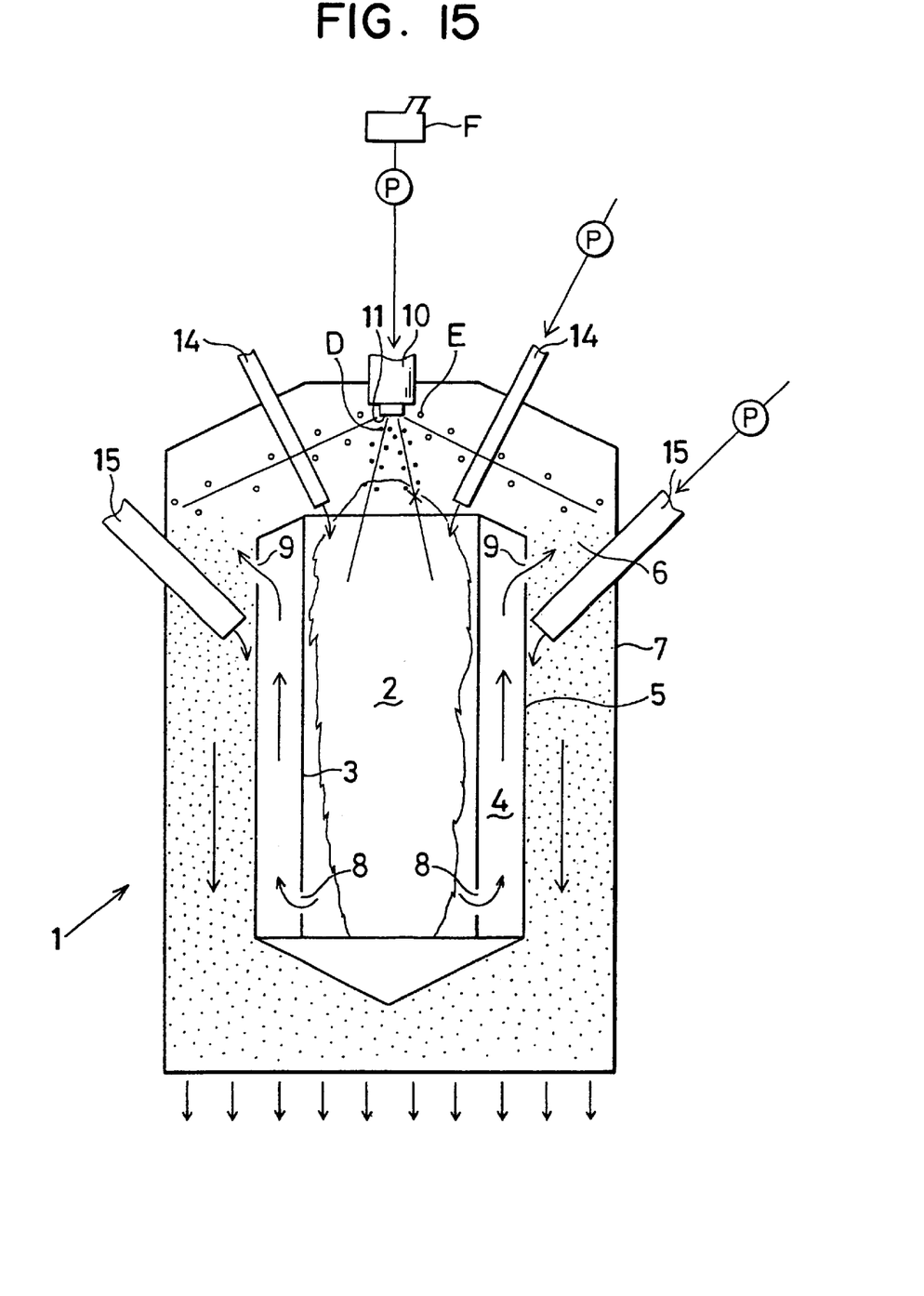
FIG. 15 is a cross-sectional view showing a liquid fuel vaporizer as a seventh embodiment of the present invention.

A seventh embodiment of the present invention will be described in reference to FIG. 15. The structure of the liquid fuel vaporizer 1 itself is the same as that of the first embodiment. However, the liquid fuel supplied from the fuel injector 10 is changed to a mixture of liquid fuel and incombustible fluid. The liquid fuel may be gasoline, light oil, kerosene, methanol or the like, and the incombustible fluid may be liquid such as water, or gaseous fluid such as inert gas like argon. Both of the fuel D supplied to the combustion chamber 2 and the fuel E supplied to the vaporization chamber 6 are mixed with the incombustible fluid. The mixing ratio of fuel to incombustible fluid is variously chosen according to kinds of fuel and incombustible fluid. In this particular embodiment, fuel and water are mixed with an equal volume.

The combustion temperature in the combustion chamber 2 is lowered by supplying such a mixture to the combustion chamber 2, and the self-igniting temperature in the vaporization chamber 6 increases by supplying such a mixture to the vaporization chamber 6. Accordingly, the temperature of burnt gas supplied to the vaporization chamber 6 is lowered. Combustion of the vaporized fuel in the vaporization chamber 6 is prevented by composite effects of the lower burnt gas temperature and the higher self-igniting temperature. The mixture of fuel and incombustible fluid may be used in place of fuel in other embodiments described above, too.

Though the combustion chamber 2 is disposed inside of the vaporization chamber 6 in all the embodiments described above, they may be disposed in a reversed manner, i.e., the combustion chamber 2 may be disposed outside of the vaporization chamber 6. Though both combustion and vaporization chambers are formed by coaxially disposed cylinders, they may be formed by dividing the inner space of the housing 7 into two chambers connected to each other through the burnt gas passage 4.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A liquid fuel vaporizer comprising:

a housing;

a fuel injector disposed in the housing for supplying liquid fuel;

a combustion chamber housed in the housing for generating heat by burning the liquid fuel supplied from the fuel injector; and a vaporization chamber housed in the housing for vaporizing the liquid fuel supplied from the fuel injector by the heat generated in and transferred from the combustion chamber; wherein:

the fuel injector supplies liquid fuel to both of the combustion chamber and the vaporization chamber; and the combustion chamber is disposed inside the vaporization chamber.

2. The liquid fuel vaporizer as in claim 1, wherein:

both the combustion and vaporization chambers are cylinder-shaped and disposed coaxially to each other.

3. The liquid fuel vaporizer as in claim 1, wherein:

a burnt gas passage is formed between the combustion chamber and the vaporization chamber; and the burnt gas passage leads burnt gas in the combustion chamber into the vaporization chamber and prevents flame from being transferred from the combustion chamber to the vaporization chamber.

4. The liquid fuel vaporizer as in claim 1, wherein:

the combustion chamber includes a separating plate for separating it from the vaporization chamber.

5. A liquid fuel vaporizer comprising:

a housing;

a fuel injector disposed in the housing for supplying liquid fuel;

a combustion chamber housed in the housing for generating heat by burning the liquid fuel supplied from the fuel injector; and a vaporization chamber housed in the housing for vaporizing the liquid fuel supplied from the fuel injector by the heat generated in and transferred from the combustion chamber; wherein:

the fuel injector supplies liquid fuel to both of the combustion chamber and the vaporization chamber; and the fuel injector includes first injection holes for supplying liquid fuel into the combustion chamber and second injection holes for supplying liquid fuel into the vaporization chamber.

6. The liquid fuel vaporizer as in claim 5, wherein:

a diameter of the first injection hole is smaller than that of the second injection hole.

7. A liquid fuel vaporizer comprising:

a housing;

a fuel injector disposed in the housing for supplying liquid fuel;

a combustion chamber housed in the housing for generating heat by burning the liquid fuel supplied from the fuel injector;

a vaporization chamber housed in the housing for vaporizing the liquid fuel supplied from the fuel injector by the heat generated in and transferred from the combustion chamber; and a fuel collision block disposed around the fuel injector; wherein:

the fuel injector supplies liquid fuel to both of the combustion chamber and the vaporization chamber; and part of the liquid fuel injected from the fuel injector collides with the fuel collision block and is supplied to the combustion chamber, and the liquid fuel not colliding with the fuel collision block is supplied to the vaporization chamber.

8. The liquid fuel vaporizer as in claim 7, wherein:

the fuel collision block includes sharp edges with which the part of liquid fuel supplied from the fuel injector collides.

9. The liquid fuel vaporizer as in claim 7, wherein:

the fuel collision block includes a fuel absorber that absorbs fuel colliding with the fuel collision block and adhering thereto.

10. The liquid fuel vaporizer as in claim 7, wherein:

the fuel collision block includes depressions that temporarily retain fuel colliding with the fuel collision block and adhering thereto.

* * * * *